(12) United States Patent
Herbst

(10) Patent No.: US 6,446,780 B1
(45) Date of Patent: Sep. 10, 2002

(54) TORSIONAL VIBRATION DAMPER

(75) Inventor: Rüdiger Herbst, Rochester, MI (US)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/687,677

(22) Filed: Oct. 13, 2000

(30) Foreign Application Priority Data

Oct. 13, 1999 (DE) .......................................... 199 49 362

(51) Int. Cl.⁷ ................................................. F16D 3/66
(52) U.S. Cl. .............................. 192/213.22; 192/70.17; 464/68
(58) Field of Search .............................. 192/212, 70.17, 192/213, 213.2, 213.21, 213.22, 213.3; 464/67, 68

(56) References Cited

U.S. PATENT DOCUMENTS

| | | | | |
|---|---|---|---|---|
| 4,645,053 A | * | 2/1987 | Kitayama | 192/106.2 |
| 4,924,990 A | * | 5/1990 | Takeuchj | 192/106.2 |
| 5,609,526 A | * | 3/1997 | Kitayama et al. | 464/68 |
| 5,813,915 A | * | 9/1998 | Imanaka | 464/68 |
| 6,270,417 B1 | * | 8/2001 | Hashimoto | 464/68 |
| 6,283,864 B1 | * | 9/2001 | Reik et al. | 464/68 |

FOREIGN PATENT DOCUMENTS

DE         33 13 850       10/1984

* cited by examiner

*Primary Examiner*—Saul Rodriquez
(74) *Attorney, Agent, or Firm*—Cohen, Pontani, Lieberman & Pavane (57) ABSTRACT

A torsional vibration damper for arrangement in a clutch disk includes a hub element and a hub-disk arrangement arranged on the hub element. The hub-disk arrangement has a first transmission arrangement and a second transmission arrangement which is rotatable about an axis of rotation relative to the first transmission arrangement. A first damping arrangement acts between the first and the second transmission arrangement. A third transmission arrangement is connected in a rotationally fixed manner to the hub element. A second damping arrangement acts between the third transmission arrangement and one of the first and second transmission arrangements and allows a relative rotation between the third transmission arrangement and the one of the first and second transmission arrangements. Furthermore, a first friction device acts between the third transmission arrangement and at least one of the first and second transmission arrangements. The first friction device comprises a first friction-device area which, starting from a basic relative rotational position between the third transmission arrangement and the at least one transmission arrangement of the first and second transmission arrangements generates essentially no frictional force in an angular range of relative rotation between the third transmission arrangement and the at least one of the first and second transmission arrangements and generates a frictional force when the angular range of relative rotation.

16 Claims, 7 Drawing Sheets

TORSIONAL VIBRATION DAMPER

BACKGROUND OF THE INVENTION

1. Field of the Invention

The present invention relates to a torsional vibration damper for arrangement in a clutch disk including a hub element, a hub-disk arrangement carried on the hub element, the hub-disk arrangement including a first transmission arrangement and a second transmission arrangement rotatable about an axis of rotation relative to the first transmission arrangement, a first damping arrangement acting between the first and the second transmission arrangement, a third transmission arrangement connected in a rotationally fixed manner to the hub element, a second damping arrangement which acts between the third transmission arrangement and one of the first and second transmission arrangements and allows a relative rotation between the third transmission arrangement and the one of the first and second transmission arrangements, and a first friction device acting between the third transmission arrangement and at least one transmission arrangement of the first and second transmission arrangements.

2. Description of the Related Art

Reference DE 33 13 850 A1 discloses a clutch disk which contains a torsional vibration damper constructed with a hub element, a hub-disk arrangement carried on the hub element, the hub-disk arrangement including a first transmission arrangement and a second transmission arrangement rotatable about an axis of rotation relative to the first transmission arrangement, a first damping arrangement acting between the first and the second transmission arrangement, a third transmission arrangement connected in a rotationally fixed manner to the hub element, a second damping arrangement which acts between the third transmission arrangement and one of the first and second transmission arrangements and allows a relative rotation between the third transmission arrangement and the one of the first and second transmission arrangements, and a first friction device acting between the third transmission arrangement and at least one transmission arrangement of the first and second transmission arrangements.

In this reference, the third transmission arrangement is formed by a disk-type area which is formed integrally with a hub element and projects radially outward. The second transmission arrangement is formed by a hub-disk element having two sheet-metal elements. A radially inner area of the second transmission arrangement surrounds both axial sides of the first transmission arrangement. A damping-spring arrangement acts between the second transmission arrangement formed by the two sheet-metal parts and the third transmission arrangement formed by the disk-type area for allowing relative rotation of these two transmission arrangements with respect to one another in the idling range.

The second transmission arrangement is mounted radially on the hub element and one of the sheet-metal parts of the second transmission arrangement is supported axially against one axial side of the third transmission arrangement via a friction ring. A preloading spring is supported against the other one of the sheet-metal parts of the second transmission arrangement via an intermediate ring and on the other axial side of the third transmission arrangement. The friction ring, the intermediate ring and the preloading spring provide a friction device which acts between the second and third transmission arrangements. In the idling range, the friction ring converts vibrational energy into friction work and thus contributes to the damping of torsional vibrations.

SUMMARY OF THE INVENTION

It is an object of the present invention to provide a torsional vibration damper with improved capability for tuning to vibration characteristics that occur in particular drive systems, especially in the idling or predamping range.

According to the present invention, the object is achieved by a torsional vibration damper for arrangement in a clutch disk, comprising a hub element and a hub-disk arrangement carried on the hub element. The hub disk arrangement comprises a first transmission arrangement and a second transmission arrangement which is rotatable about an axis of rotation relative to the first transmission arrangement. A first damping arrangement such as, for example, a damping-spring arrangement acts between the first and the second transmission arrangement. A third transmission arrangement is arranged on the hub element in a rotationally fixed manner or may alternatively comprise an integral part with the hub element. A second damping arrangement such as, for example, a damping-spring arrangement acts between the third transmission arrangement and one of the first and second transmission arrangements. The second damping arrangement allows a relative rotation between the third transmission arrangement and the one of the first and second transmission arrangements. A first friction device acts between the third transmission arrangement and at least one transmission arrangement of the first and second transmission arrangements.

In the torsional vibration damper according to the present invention, the first friction device includes a first friction-device area which generates essentially no frictional force in an angular range of relative rotation between the third transmission arrangement and the at least one transmission arrangement of the first and second transmission arrangements and generates a frictional force when the angular range of relative rotation is exceeded. The angular range starts from a basic relative rotational position between the third transmission arrangement and the at least one transmission arrangement of the first and second transmission arrangements.

This arrangement allows the friction device to act parallel to the second damping arrangement. A characteristic of the friction device is that a significant rise in the frictional force is generated from a particular angle of relative rotation onward—that is to say there is a delayed friction characteristic—for obtaining improved tunability to particular vibrations or particular drive systems. In addition to the strength of the frictional force generated, the magnitude of the adjustable angular ranges of relative rotation represents a further parameter that may be varied for the purpose of tuning to particular systems.

In a preferred embodiment of the present invention, the first friction-device area of the first friction device is effective only between the third transmission arrangement and that transmission arrangement of the first and second transmission arrangements which interacts with the second damper arrangement.

The ability to tune to the particular requirements of a specific application of the torsional vibration damper may be improved further if the first friction device further comprises a second friction-device area which generates a frictional force essentially independently of the relative rotational position of the third transmission arrangement and the at least one transmission arrangement of the first and second transmission arrangements. In this embodiment, a basic friction is already being generated within the angular range of relative rotation. The basic friction is then increased further by the first friction-device area when the angular range of relative rotation is exceeded.

The torsional vibration damper according to the present invention for the first friction-device area comprises a friction-element arrangement which rests under preload against the third transmission arrangement and/or the at least one transmission arrangement of the first and second transmission arrangements. The friction-element arrangement may comprise at least one friction element which rubs against the third transmission arrangement and/or the at least one transmission arrangement of the first and second transmission arrangements. This friction element may rub against the at least one transmission arrangement of the first and second transmission arrangements and may be coupled or connectable in a rotationally fixed manner to the third transmission arrangement.

The delayed-action friction characteristic may be obtained in a simple manner by arranging the at least one friction element so that it is freely rotatable relative to the third transmission arrangement in an angular range of relative rotation between the third transmission arrangement and the at least one transmission arrangement of the first and second transmission arrangements and so that the at least one friction element is coupled to the third transmission arrangement when the angular range of relative rotation is exceeded. The at least one friction element is freely rotatable starting from a basic relative rotational position between the third transmission arrangement and the at least one transmission arrangement of the first and second transmission arrangements.

For optimizing the utilization of installation space, the preferred embodiment includes an area of the transmission arrangement of the first and second transmission arrangements that interacts with the second damping arrangement that has a respective disk area axially on each side of the third transmission arrangement, wherein the first friction device rubs against at least one of the disk areas. This arrangement may be achieved, for example, if the at least one transmission arrangement of the first and second transmission arrangements is of essentially symmetrical construction in both axial directions relative to the third transmission arrangement.

The structure of the torsional vibration damper according to the invention may, for example, be arranged such that the at least one transmission arrangement of the first and second transmission arrangements has at least two disk parts which, in their area which interacts with the second damping arrangement and is intended for the provision of the two disk areas, are spaced apart axially and are connected to one another radially to the outside of the disk areas. In their interconnected area, the two disk parts may be designed to interact with the first damping arrangement.

To achieve suitable centering of the hub-disk arrangement of the torsional vibration damper according to the invention relative to the hub element, the present invention furthermore provides a bearing arrangement via which the hub-disk arrangement is mounted on the hub element. The bearing arrangement is preloaded into bearing engagement on the hub element by a first preloading arrangement and comprises a bearing ring with an essentially conical, spherical or similar bearing surface via which the bearing ring is preloaded into bearing engagement against a mating bearing surface of essentially complementary form on the hub element. To allow a friction device also to act in parallel with the second damping device, which is generally a main and load damping device, i.e. to dissipate vibrational energy by producing friction work in the range of onset of the load damper range, the torsional vibration damper according to the present invention further comprises a second friction device for generating a frictional damping force during relative rotation between the first and the second transmission arrangement. The second friction device comprising at least one friction element which is acted upon by a preloading arrangement and is displaceable on the first transmission arrangement and/or the second transmission arrangement during relative rotation, thereby generating a frictional damping force.

The structure of the torsional vibration damper according to the invention may be simplified if the bearing arrangement forms at least a portion of the at least one friction element of the second friction device.

The one transmission arrangement of the first and second transmission arrangements may comprise a disk transmission arrangement and the other transmission arrangement of the first and second transmission arrangements may comprise first and second cover-disk elements arranged on opposing axial sides of the disk transmission arrangement. The first and second cover-disk elements are connected to one another in a rotationally fixed manner and a friction area of the bearing arrangement lies between the disk transmission arrangement and one of the cover-disk elements of the other transmission arrangement.

The force return path is within the torsional vibration damper if the preloading arrangement acts between the disk-type transmission arrangement and the other one of the cover-disk elements and preloads the disk-type transmission arrangement towards said one cover-disk element such that the friction area of the bearing arrangement is clamped between the disk-type transmission arrangement and the cover-disk element to generate the frictional damping force.

For example, the bearing ring may be connected in a rotationally fixed manner to either the first transmission arrangement or the second transmission arrangement.

For this purpose, the bearing ring may comprise at least one coupling portion, via which it is coupled to the first transmission arrangement or the second transmission arrangement.

The torsional vibration damper according to the present invention is furthermore preferably provided with a preloading arrangement which preloads the bearing ring into the bearing engagement so that it is supported against the hub element and against the one of the first and second transmission arrangements on which the bearing arrangement can be displaced, thereby generating the frictional damping force. The preloading arrangement may be supported against the other cover-disk element of the other of the first and second transmission arrangements.

The present invention furthermore relates to a clutch disk which includes a torsional vibration damper according to the present invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

A first embodiment of a torsional vibration damper 10 according to the present invention is shown in FIGS. 1–6. The torsional vibration damper 10 is constructed as a clutch disk in these figures. However, the torsional-vibration damper construction shown and described herein may also be used in other areas such as, for example, in a dual-mass flywheel or in a torque converter.

The torsional vibration damper 10 has a hub element 12 with internal splines 14 which is connectable to a gearbox input shaft in a manner known per se so that the hub element 12 is fixed with respect to rotation relative to the gearbox input shaft. A radially outer area of the hub element 12 has teeth 16 which correspond to internal teeth 20 arranged on a hub disk 18. The teeth 16, 20 engage with play to allow a predetermined circumferential backlash of the hub disk 18 relative to the hub element 12. The hub disk 18 is constructed from two disk parts 22, 24 (see FIG. 3) which rest against one another in their radially outer area and comprise disk areas 26, 28 in the radially inner area of the disk parts 22, 24 that are spaced apart axially. The disk areas 26, 28 of the two disk parts 22, 24 lie on each side of a flange or disk part 30 connected in a rotationally fixed manner to the hub element 12. Cover-disk elements 32, 34 are arranged on both sides of the hub disk 18 in the axial direction and are connected fly to one another in a manner known per se by spacer bolts 36 or similar mechanical connections in a radial outer area of the cover disk-elements 32, 34.

Figure 3:
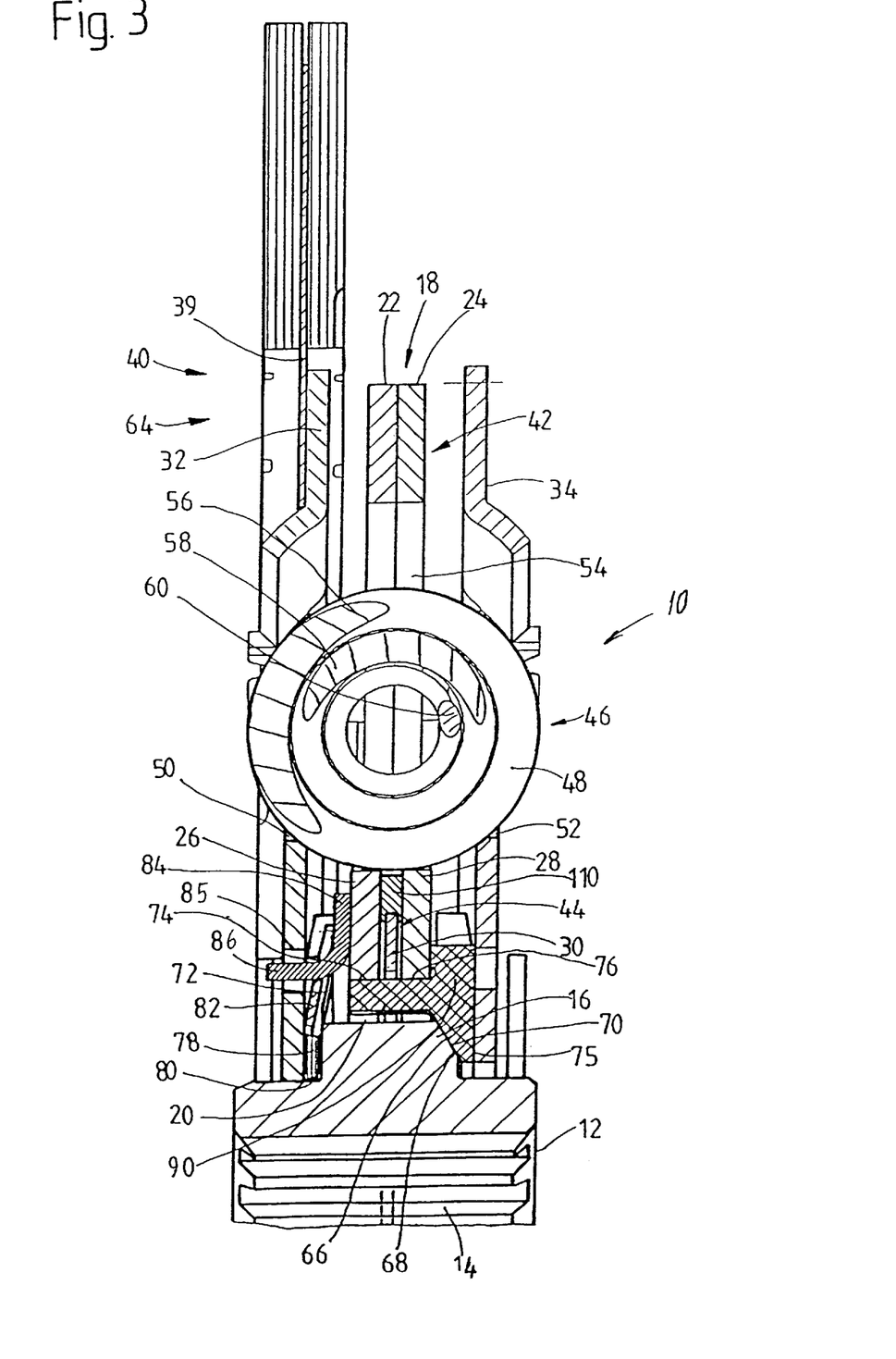
FIG. 3 is an enlarged view of the upper part of the torsional vibration damper in FIG. 2.

In the embodiment shown, the cover-disk element 32 which is shown on the left side in FIG. 3 carries the friction linings 38 for the clutch disk. The friction linings 38 may be supported axially on one another or on a lining carrier 39 in a manner known per se via lining springs.

The two cover-disk elements 32, 24 are referred to as a first transmission arrangement 40 and the hub disk 18 formed by the two disk parts 22, 24 is referred to as a second transmission arrangement 42, and the flange or disk part 30 which is connected in a rotationally fixed manner to the hub element 12 is referred to as a third transmission arrangement 44.

Figure 1:
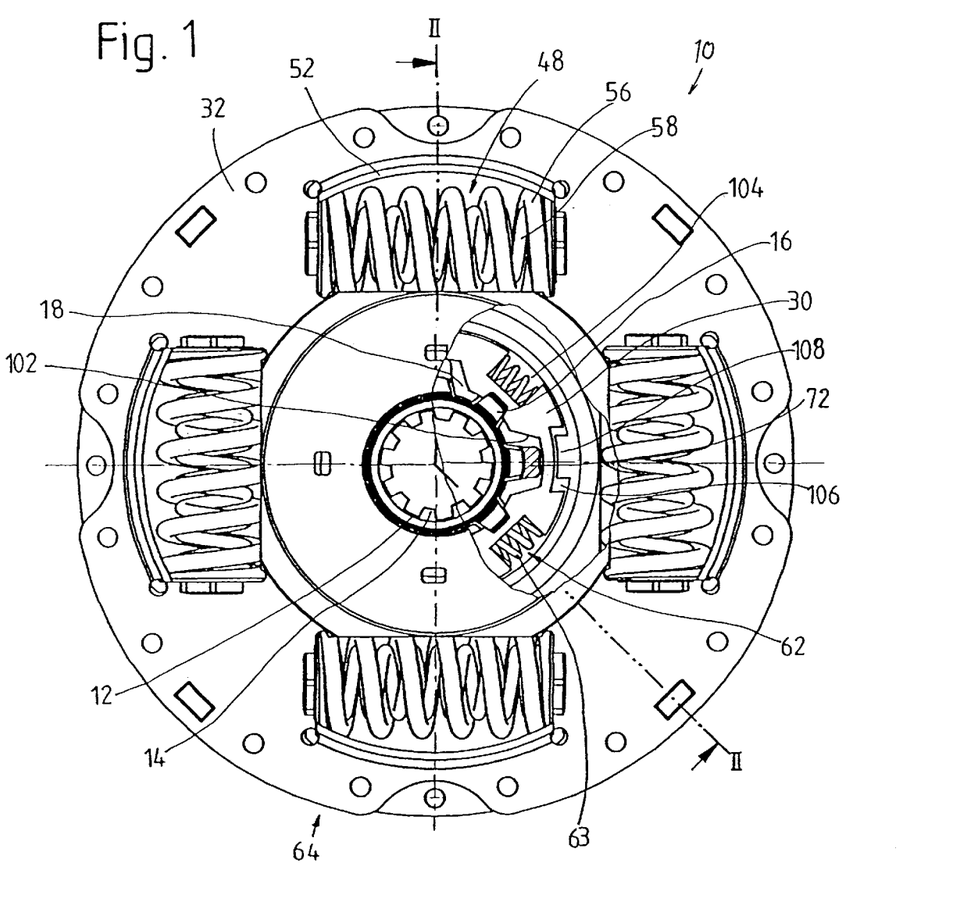
FIG. 1 is a partial cutaway axial view of a torsional vibration damper in the form of a clutch disk according to an embodiment of the present invention.
Figure 2:
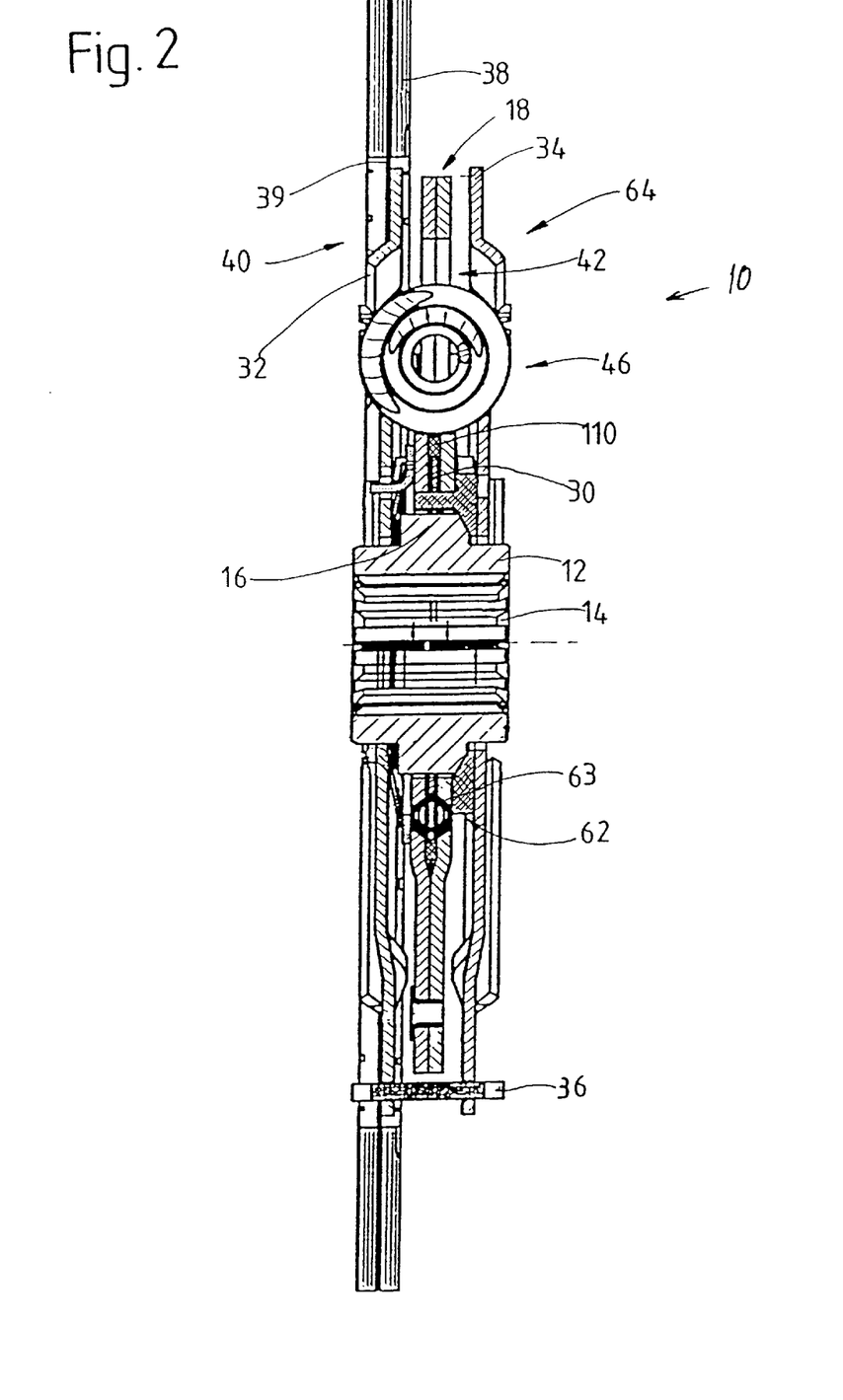
FIG. 2 is a sectional view of the torsional vibration damper along a line II—II in FIG. 1.

A first damping arrangement 46 acts between the first transmission arrangement 40 and the second transmission arrangement 42. The first damping arrangement comprises respective damping-spring arrangements 48 arranged in spring apertures 50, 52 in the cover-disk elements 32, 34 and in an associated spring aperture 54 in the hub disk 18 (see FIG. 1). The damping spring arrangements 48 are supported in spring apertures 50, 52 and spring aperture 54 in the circumferential direction or approximately in the circumferential direction against respective control edges. FIGS. 1 to 3 show that each damping-spring arrangement 48 (four damping-spring arrangements distributed in the circumferential direction are provided in the embodiment shown) comprises three nested springs 56, 58 and 60. That is, the springs 56, 58, 60 are situated concentrically one inside the other. The springs 56 and 58 extend over the entire length of the respective spring aperture and are thus supported against the respective control edges in the circumferential end regions, even in no-load operation. The innermost spring 60 may have a shorter length and, when under little or no load, rests against the associated spring apertures only in an end region. The operation of this damping-spring arrangement 48 will be explained below.

A second damping arrangement 62 is arranged for acting between the second transmission arrangement 42 and the third transmission arrangement 44. The second damping arrangement 42 has a plurality of circumferentially distributed damping springs 63 which are accommodated in respective spring apertures in the disk parts 22, 24 of the hub disk 18 and in the flange or disk part 30. The second damping arrangement 62 forms an idle-speed damper and the first damping arrangement 46 forms a main or load damper.

Together, the cover-disk elements 32, 34, the hub disk 18, the first and second damping arrangements 46, 62 and components described below interacting with these components form a hub-disk arrangement 64 which is mounted on the hub element 12 via a bearing ring 66. The bearing ring 66 has a bearing surface 68 in the form of a cone which rests on a complementary mating bearing surface 70 on the hub element 12. A spherical configuration or any other configuration which allows slight tilting or radial yielding of the clutch-disk arrangement 64 relative to the hub element 12 may be provided instead of the conical configuration. The bearing ring 66 further comprises a plurality of coupling projections 72 arranged in a circumferentially distributed manner which engage cutouts 74, 76 in the disk parts 22, 24 and thus hold the bearing ring 66 fixed with respect to rotation relative to the hub disk 18. The engagement of the coupling projections 72 in the cutouts 74, 76 also fixes the radial position of the hub disk 18 and thus of the entire hub-disk arrangement 64 relative to the bearing ring 66. The bearing ring 66 furthermore rests by a friction face 75 against the cover-disk element 34 visible on the right in FIG. 3.

To fix and center the hub-disk arrangement 64 axially relative to the hub element 12, a first preloading spring 80 which may comprise a corrugated spring, Belleville spring or the like, acts between a radial shoulder 78 of the hub element 14 and the cover-disk element 32 which is arranged on the left in FIG. 3. The first preloading spring 80 urges the entire hub-disk arrangement 64 towards the left and thus ensures that the bearing ring 66 rests in a supporting position on the hub element 12, i.e. on the mating bearing surface 70 of the hub element 12. A friction ring or support ring may, for example, be arranged between the radial shoulder 78 and the first preloading spring 80 and/or between the first preloading spring 80 and the cover-disk element 32.

A second preloading spring 82 which may also, for example, comprise a corrugated spring or Belleville spring or the like may be provided for pressing a support ring 84 of essentially L-shaped cross section against the hub disk 18 and being supported against the cover-disk element 32. The support ring 84 comprises axial extensions 86 which engage in cutouts 85 in the cover-disk element 32. Accordingly, the support ring 84 is fixed with respect to rotation relative to the cover-disk element 32 and thus relative to the first transmission arrangement 40.

Figure 4:
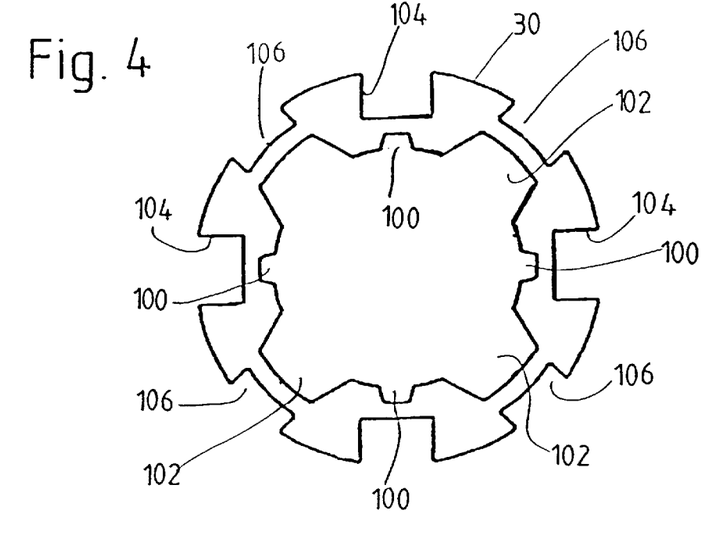
FIG. 4 is an axial view of a disk part of an idle-speed damper arrangement of the torsional vibration damper of FIG. 1.
Figure 5:
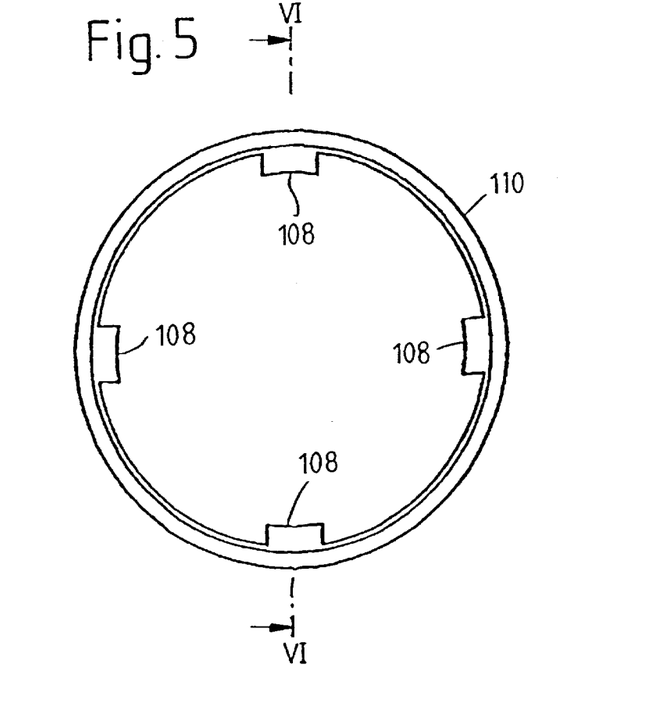
FIG. 5 is an axial view of a friction ring for a friction device assigned to the idle-speed damper arrangement of the torsional vibration damper of FIG. 1.
Figure 6:
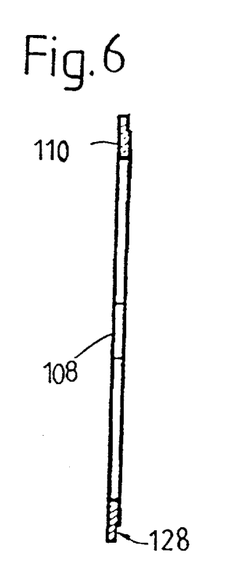
FIG. 6 is a sectional view of the friction ring along the line VI—VI in FIG. 5.

FIG. 4 is a side view of the disk part 30 described above which may also be viewed in the cut-away portion of FIG. 1. An inner circumferential area of the disk part 30 has a plurality of circumferentially successive coupling recesses 100. The disk part 30 is pushed axially onto the external teeth 16 of the hub element 12 so that the teeth 16 engage the recesses 100 and form a rotationally fixed connection between the disk part 30 and the hub element 12. Circumferentially between each pair of these coupling recesses 100, the disk part 30 comprises an entry recess 102 through which a respective coupling projection 72 of the bearing ring 66 projects. The entry recesses 102 are larger in the circumferential direction than the coupling recesses 100 so that there is no mutual interference here between the disk part 30 and the bearing ring 66 in the case of relative rotation. An outer circumferential area of the disk part 30 includes respective spring accommodation recesses or spring apertures 104 in which the damping springs 63 of the second damping arrangement 62 are arranged. The damping springs 63 are supported in both circumferential directions in these recesses or apertures 104 in a manner known per se. The disk part further comprises a driver recess 106 arranged between each pair of such spring accommodation recesses 104.

Referring now to FIGS. 2, 3, 5, and 6, a friction ring 110 is arranged between the disk areas 26, 28 of the disk parts 22, 24 of the hub disk 18. The friction ring 110 comprises driver projections 108 shown in FIGS. 5 and 6 which extend radially inward and engage the driver recesses 106 of the disk part 30 (see FIG. 4). As can be seen from FIG. 1, this engagement is such that a relative circumferential movement is allowed to occur between the friction ring 110 and the disk part 30. The relative circumferential movement is achieved by virtue of the fact that the circumferential extent of the driver projections 108 is slightly less than the circumferential extent of the driver recesses 106. The difference between the circumferential extent of the driver projections 108 and the driver recesses 106 is within an angular range including 2° to 6°. The difference is preferably 4°. Starting from the neutral rotational position shown in FIG. 1 in which the driver projection 108 is arranged in the middle of the driver recess 106, the disk part 30 can rotate in both circumferential directions by 2° relative to the friction ring 110 for example before the driver projections 108 are taken along in the circumferential direction by the circumferential boundaries of the driver recesses 106.

In the embodiment of FIGS. 2 and 3, the friction ring 110 is formed from flexible material which is compressed by virtue of its positioning between the two axially spaced disk areas 26, 28. The friction ring 110 thus rests under prestress against the disk areas 26, 28. The friction ring 110 interacts with the disk part 30 so that the friction ring 110 forms a friction device with a delayed action for the idle-speed damper range.

The operation of a torsional vibration damper with a friction ring 110 arranged as a friction device with a delayed action will be described below.

In a state in which only weak torques or torque fluctuations are to be transmitted via the torsional vibration damper 10 of the clutch disk shown in FIGS. 1 to 3, the first, second, and third transmission arrangements 40, 42 and 44 remain in initial positions, i.e. relative rotational positions in which the springs of the respective damping arrangements 46 and 62 are essentially relaxed or to the greatest possible extent relaxed. If the torque to be transmitted rises or if larger torque fluctuations occur, the disk parts 22, 24 begin to rotate relative to the disk part 30 and compress the springs 63 of the second damping arrangement 62, i.e., the idling damper. Each of the springs 63 comprises one end supported against the control edges of the spring apertures in the disk parts 22, 24 and another end supported against the control edges of the disk part 30. During this relative rotation, the first and second transmission arrangements 40, 42 thus rotate in common relative to the third transmission arrangement 44 because the springs 56, 68, 60 of the first damping arrangement 46 i.e., the load damper, remain essentially uncompressed due to their greater spring stiffness. During this relative rotation, a basis friction force is generated in the area in which the corrugated spring 80 is supported against the radial shoulder 78 of the hub element 14 and in the area in which the corrugated spring 80 is supported against the cover-disk element 32. The basic friction force also includes friction generated by the sliding contact between the bearing surface 68 and the mating bearing surface 70. Since the hub disk 18 is displaced together with the cover-disk elements 32, 34 in this initial relative rotation, no friction is generated in the area of the friction face 75 of the bearing ring 66.

After a minimum rotational angle between the second transmission arrangement 42, i.e. the hub disk 18, and the third transmission arrangement 44, i.e. the disk part 30, the circumferential backlash between the driver projections 108 of the friction ring 110 and the driver recesses 106 in the disk part 30 is used up. Further rotation of the first and second transmission arrangement 40, 42 relative to the third transmission arrangement 44 against the urgency of the springs 63 causes the friction ring 110 to be taken along in rotation by the disk part 30. As the friction ring 110 is taken along by the disk part 30, the friction ring 110 is displaced along the disk areas 26, 28 of the second transmission arrangement 42, thereby generating a delayed frictional force in addition to the basic friction force described above. The basic friction force is essentially independent of the angle of relative rotation between the second transmission arrangement 42 and the third transmission arrangement 44 while the friction ring 110 generates a friction with a delayed action which is dependent on the angle of relative rotation. After the relative rotation between the second and third transmission arrangements 42, 44 has reached a maximum deflection associated with a particular torsional vibration, a movement in the opposite direction then begins, i.e., a movement back to the initial position. Upon rotation in the opposite direction, this friction with a delayed action generated by the friction ring 110 comes into effect again when the full circumferential backlash between the friction ring 110 and the disk part 30 has been used up. Accordingly, a continuously acting friction and a friction with a delayed action is present not only starting from a neutral, unloaded position but also starting from a loaded maximum deflection position associated with a particular torsional vibration.

If the torque rises or more pronounced torsional vibrations occur, the springs 63 of the damping arrangement 62 are compressed until the teeth 20, 16 on the hub disk 18 and the hub element 12 rest against one another in the circumferential direction and thus prevent further rotation of the hub disk 18, i.e. of the second transmission arrangement 42, relative to the hub element 12. When the second transmission arrangement 42 is prevented from rotating relative to the third transmission arrangement 44, further rotation of first transmission arrangement 40 relative to the second transmission arrangement 42 and the third transmission arrangement 44 causes the springs 56, 58 of damping arrangement 46 which are supported between control edges of the cover-disk elements 32, 34 and control edges of the disk parts 22, 24, to compress. A relative rotation now occurs between the first transmission arrangement 40 and the second transmission arrangement 42 and a relative rotation also occurs between the first transmission arrangement 40 and the hub element 12. A basic friction acting over the entire range of rotation is generated by the support of the spring 80 against the hub element 12 and against the cover-disk element 32. Furthermore, friction in the area of the friction face 75 of the bearing ring 66 is now generated by the urgency of the spring 82 since a friction area 90 of the bearing ring 66 extends between the hub disk 18 and the cover-disk element 34 is clamped in the axial direction between the cover-disk element 34 and the disk part 24 of the hub disk 18. Friction relative to the hub disk 18 is furthermore generated in the area of the support ring 84. Since the hub disk 18 does not rotate relative to the hub element 12 in this operating state no friction occurs in the area of the bearing surface 68 and the mating bearing surface 70.

If the torque to be transmitted rises further or the torque fluctuations increase further, the springs 56, 58 are compressed to such an extent that spring 60 is now also compressed between the associated control edges. Accordingly, a further spring of the damping-spring arrangement comes into effect in each damping-spring arrangement 48. This means that a graduated spring characteristic is also provided in the working range of the first damping arrangement 46, i.e., the load damper. However, the basic frictional force generated by the bearing ring 66 and also the frictional effect generated by the spring 80 act over the entire working range of the main damper.

As described above, the first and second damping arrangements 46, 62 of the torsional vibration damper 10 according to the present invention are connected in series, i.e. the first damping arrangement 46 comes into effect essentially only when the second damping arrangement 62 reaches its maximum rotational angle. Within each of the first and second damping arrangements 46, 62, the respective sets of springs 56, 58, 60 and 63 operate in parallel.

The symmetrical configuration both of the second transmission arrangement 42 and of the first transmission arrangement 40 relative to the flange or disk part 30—i.e. the construction of this transmission arrangement is essentially identical in both axial directions—allows an arrangement of extremely short construction in the axial direction. The sort axial construction is additionally assisted by the fact that it is not necessary to provide a separate friction device as in the prior art since the function of the friction device for the main damper stage or load damper stage is assumed by the friction ring 66.

Figure 7:
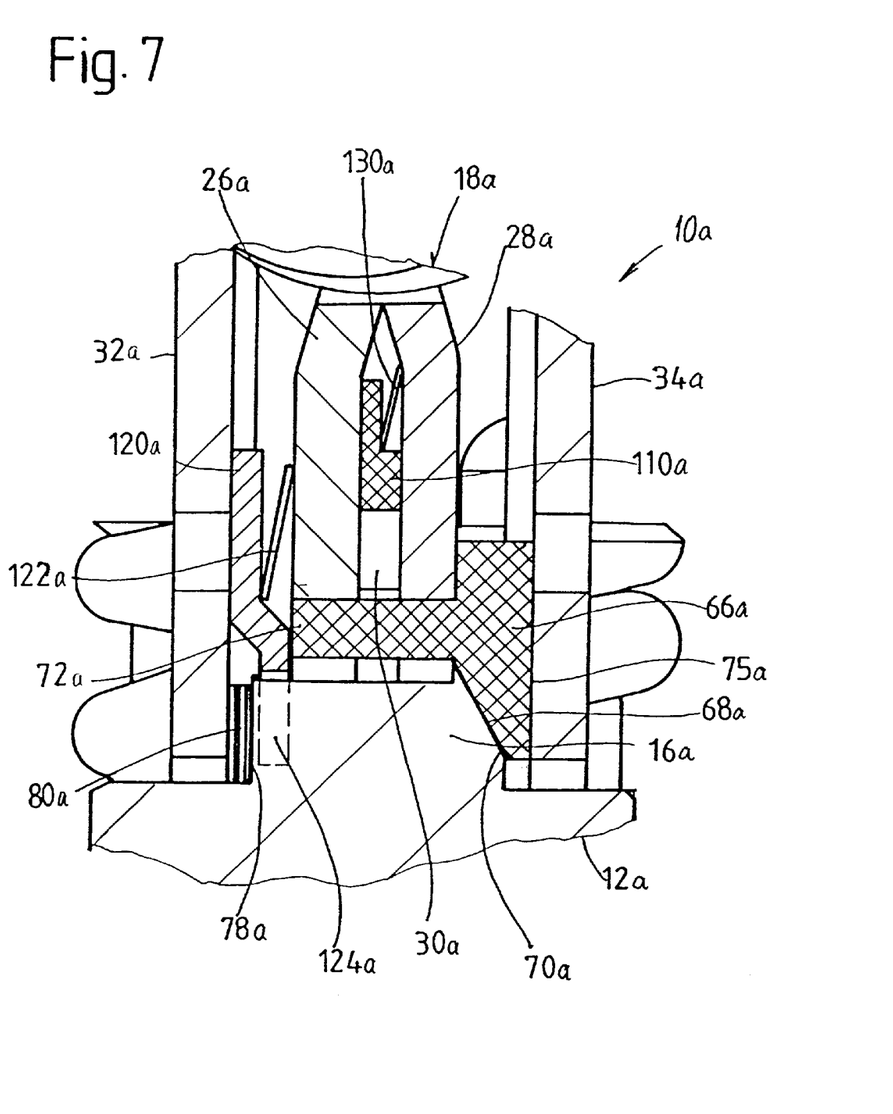
FIG. 7 is a partial view corresponding to FIG. 3 of another embodiment of a torsional vibration damper of the present invention in the area of the mounting of the hub-disk arrangement on the hub element.

FIG. 7 shows a further embodiment of the torsional vibration damper 10a according to the present invention in which elements which correspond in construction and function to components described above are denoted by like reference characters with a suffix "a". A friction ring 120a comprises a radial inner toothed area 124a arranged for engaging the teeth 16a of a hub element 12a. The friction ring 120a is arranged between a disk area 26a of the hub disk 18a and a preloading spring element 122a, for example a Belleville spring or corrugated spring or the like. The spring element 122a is arranged between the disk area 26a and the friction ring 120a for urging the friction ring 120a axially against the cover-disk element 32a. If a torsional vibration occurs which produces the joint deflection of the hub disk 18a and the cover-disk elements 32a, 34a relative to the disk part 30a and the hub element 12a, the friction ring 120a held in a rotationally fixed manner on the hub element 12a generates a friction at the cover-disk element 32a. Friction generated between the bearing ring 66a and the hub element 12a in the area of surfaces 68a, 70a is added to the friction generated by the friction ring 120a. If the free angle range mentioned previously between the friction ring 110a and the disk part 30a is departed from or exceeded, the delayed-action friction generated by the friction ring 110a also comes into effect. After the free angle range is used up, the friction ring 110a now rotates together with the disk part 30a relative to disk areas 26a, 28a, i.e., the friction ring 110a slides on the disk areas 26a, 28a.

In the embodiment shown in FIG. 7, the preloading force for the friction ring 110a is no longer exclusively generated by its flexibility and clamping between disk areas 26a, 28a. As is evident in the friction ring 110 shown in FIG. 6, the friction ring 110a has a step-like depression or axially thinned portion 128a in a radially outer area against which a preloading spring element 130a such as, for example, a Belleville spring or corrugated spring is axially supported. In FIG. 7, the abutment is formed by the hub disk 18a or the disk area 28a thereof. Attention is drawn to the fact that such an embodiment of the friction ring 110a with a sole or additional preloading force generated by a spring 130a may, of course, also be employed in the embodiment of FIGS. 1 to 3 described above.

Furthermore, the friction ring 120a may have a delayed-action characteristic if the teeth 124a of the friction ring 120a have a backlash in the circumferential direction relative to the external teeth 16a of the hub element 12a. Only when the hub disk 18a (second transmission arrangement 42) and the cover-disk elements 32a, 34a (first transmission arrangement 40) rotate in common relative to the hub element 12a by an extent corresponding to this circumferential backlash does the friction ring 120a become effective for generating friction. The friction ring 120a may be arranged to be effective within the range of action of the friction ring 110a. However, the friction ring 120a may generate friction only when the range of the second damping arrangement 62a (see FIGS. 1–3) has already been exceeded and a relative rotation between the hub element 12a and the cover-disk elements 32a, 34a is already occurring. In this case, the basic friction force for the range of the second damper arrangement 62a is then generated essentially by the sliding-contact surfaces 68a, 70a of the hub element 12a and the friction ring 66a, this being promoted by clamping the spring element 80a between the hub element 12a and the cover-disk element 32a.

Figure 8:
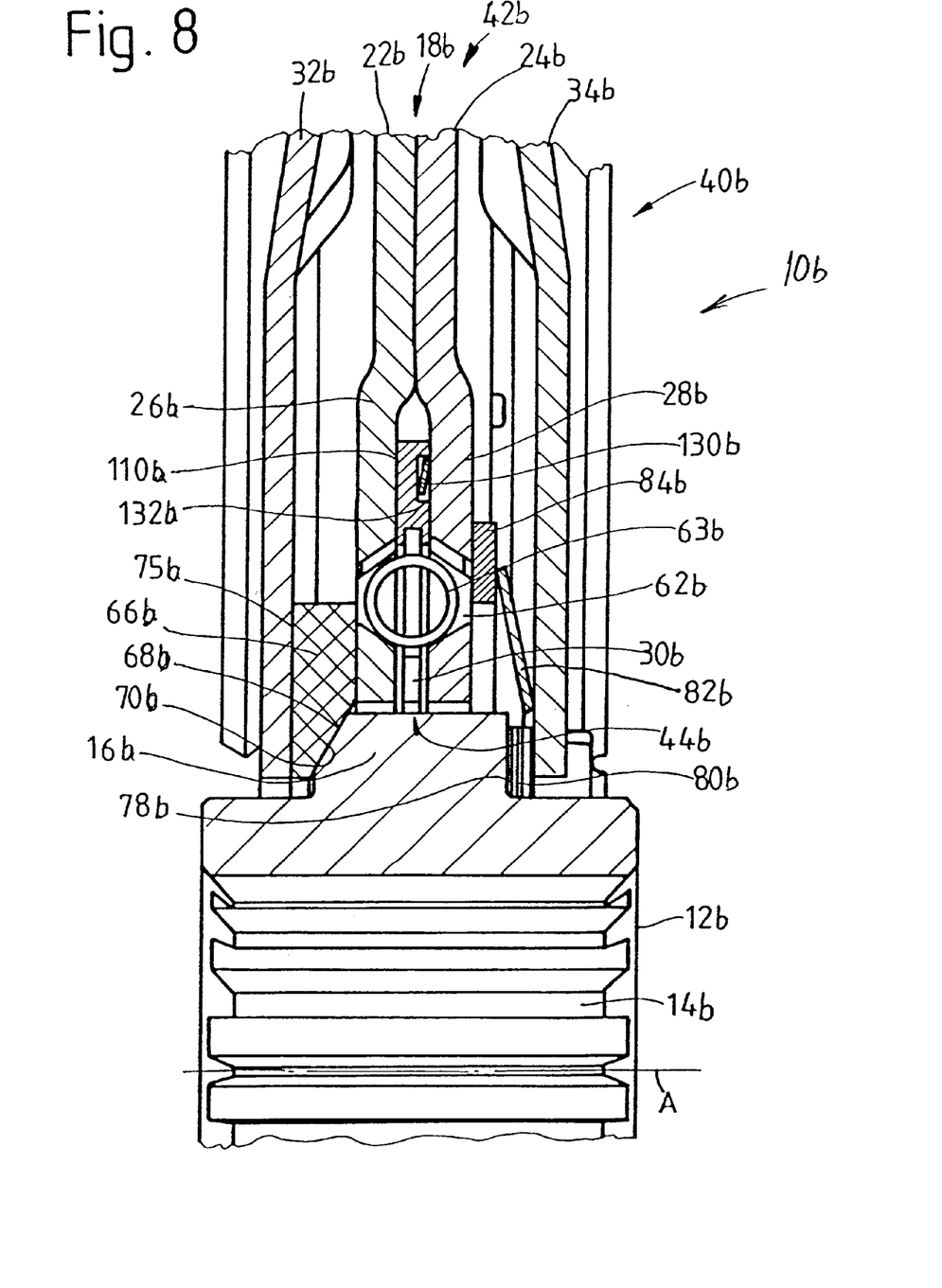
FIG. 8 is another partial view corresponding to FIG. 3 of a further embodiment of a torsional vibration damper of the present invention in the area of the mounting of the hub-disk arrangement on the hub element.

FIG. 8 shows another embodiment of the torsional vibration damper shown in FIGS. 1 to 3. Components which correspond in terms of their construction or operation to the components described above are denoted by the same reference numerals with a suffix "b".

In the embodiment of FIG. 8, the bearing ring 66b is arranged axially between the cover-disk element 32b (the first transmission arrangement 40) and the disk part 22b of the hub disk 18b (the second transmission arrangement 42). The preloading spring 82b acts between the cover-disk element 34b and the disk part 24b which is supported by a support ring 84b against the hub disk 18b and thus supplies the preloading force for the frictional damping force to be generated in the area of the friction face 75b. The spring 80b also acts between the cover-disk element 34b and the hub element 12b. To this extent, the embodiment of FIG. 8 corresponds to the construction shown in FIGS. 1 to 3 and represents a mirror-inverted representation. However, a difference between these embodiment is that the bearing ring 66b is freely rotatable both relative to the cover-disk element 32b and to the hub disk 18b. Likewise, the support ring 84b is also freely rotatable and is supported against the hub disk 18b by the spring 82b. In other words, if relative rotations occur between the first and the second transmission arrangement 40b, 42b, the bearing ring 66b and the support ring 84b will rotate together with the component with which they have the higher static friction. The bearing ring 66b may rotate either with the cover-disk element 32b or with the disk part 22b. In certain circumstances, the bearing ring 66b may also slip relative to both the cover disk-element 32b and the disk part 22b. The same applies for the support ring 84b which may rotate with the disk part 24b, with the spring 82b, or relative to the disk part 24b and the spring 82b. It should be noted that a sliding-frictional force may be generated in the area of support for the spring 82b on the cover-disk element 34b or 32b both in the embodiment shown in FIG. 8 and in the embodiment shown in FIGS. 1 to 3. This will be the case when the support of the springs 82, 82b against the support ring 84, 84b results in the generation of a higher stactic friction force in this area than is generated by the support of these springs 82, 82b against the associated cover-disk element 34 or 32, 34b or 32b.

In the embodiment shown in FIG. 8, the friction ring 110b is again arranged between the disk areas 26b, 28b for generating a delayed-action friction for the second damper arrangement 62b. In this embodiment, the friction ring 110b has a groove-like depression 132b which extends in the circumferential direction and in which the spring element 130b is accommodated. In this embodiment, the preloading force for the frictional effect generated by the friction ring 110b may be generated by the inherent flexibility of the friction ring 110b and/or by the spring force of the spring 130b. The basic friction force for this embodiment is generated by the sliding movement of the surfaces 68b, 70b against one another and by the friction occurring in the area of the spring element 80b with respect to the hub element 12b and/or the cover-disk element 34b.

Attention is drawn to the fact that the disk part 30b in the embodiment shown in FIG. 8 does not require the entry recess 102 because the friction ring 66b does not have any coupling projections. Therefore, additional coupling recesses 100b may be provided here to ensure a higher strength of the coupling between the disk part 30b and the hub element 12b.

The operation of the embodiment in FIG. 8 corresponds to the operation of the embodiment described above and attention is therefore drawn to the details given above.

Figure 9:
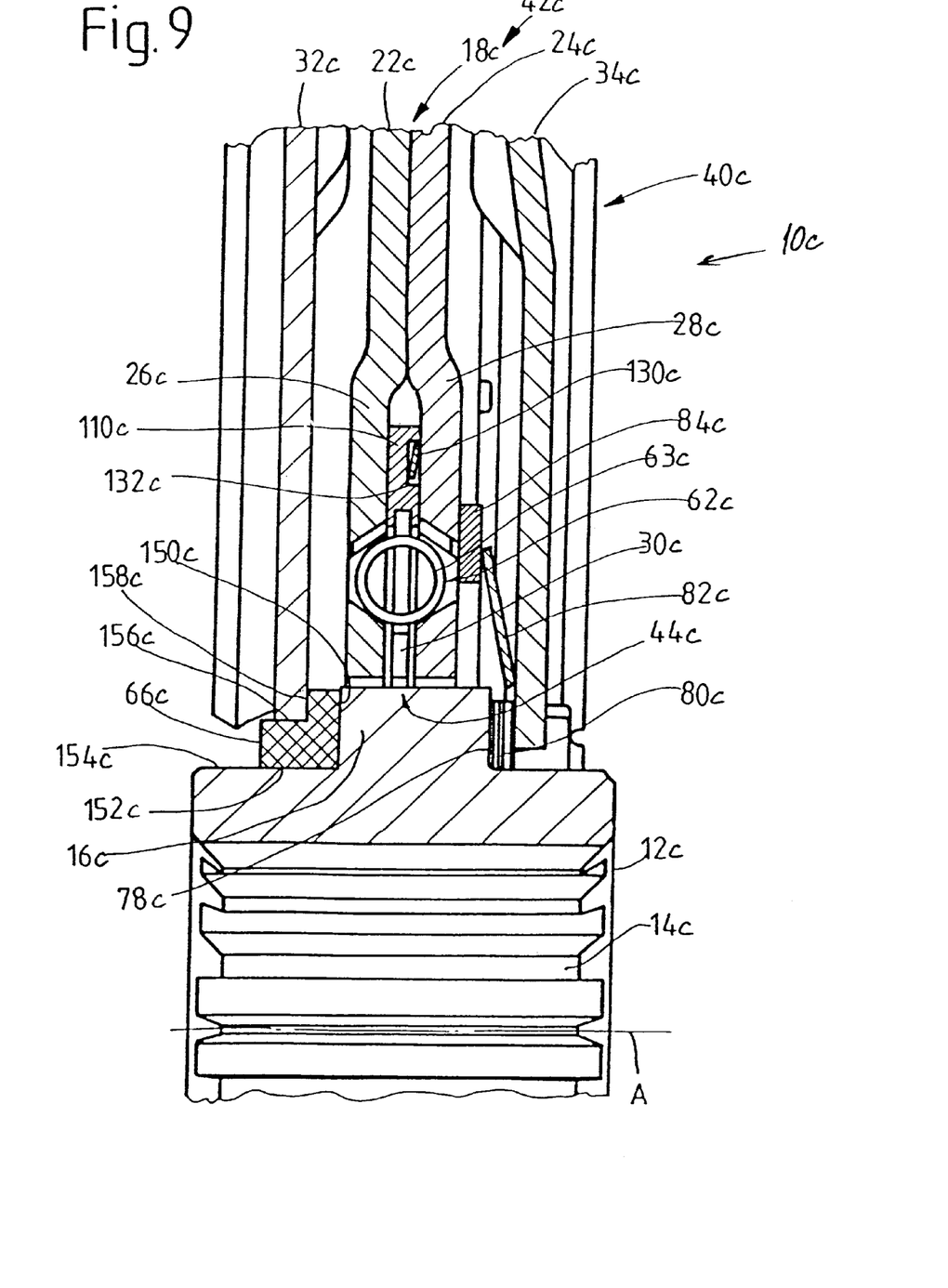
FIG. 9 is a view corresponding to FIG. 8 of yet another embodiment of a torsional vibration damper according to the present invention.

A further embodiment of the present invention is shown in FIG. 9 which is a modification of the embodiment of FIG. 8. Components in the embodiment of FIG. 9 which correspond in terms of their construction or operation to the components described above are denoted by the same reference numerals with a suffix "c". In the torsional vibration damper 10c of FIG. 9, the bearing ring 66c does not include a conical oblique surface for centering the bearing ring 66c relative to the hub element 12c. In contrast to the previous embodiments, the hub ring 66c comprises an axial end face 150c supported against an opposing axial face on the teeth 16c provided on the hub element 12c. The hub ring 66c further comprises an inner circumferential surface 152c facing radially inward supported against an outer circumferential surface area 154c of the hub element 12c. An inner circumferential surface of the cover-disk element 32c, i.e., a radial inner side of the cover-disk element 32c, is supported against a radially outward-facing radial bearing surface 156c of the bearing ring 66c. An axial support for the cover-disk element 32c includes a radially extending and axially facing support surface 158 arranged on the bearing ring 66c which supports a radially inner and axially facing surface area of the cover-disk element 32c. The bearing ring 66c is freely rotatable relative to the hub element 12c and relative to the cover-disk element 32c, allowing the bearing ring 66c to move with the element with which the friction is higher when torsional vibrations occur. In other respects, the embodiment of FIG. 9 corresponds as regards construction and operation to the embodiment described above and shown in FIG. 8, and attention is therefore drawn to the statements made in this regard.

The present invention provides a torsional vibration damper which may be used in a clutch disk. The torsional vibration damper provides separately acting friction devices that operate essentially independently of one another both for the idle-speed damper and for the load damper while having a small axial dimension. The separately acting friction devices are effected by springs which act independently of one another for generating the frictional force, i.e. the preloading force for respective friction elements. Since first and second transmission arrangements of the torsional vibration device are of essentially symmetrical configuration in the axial direction relative to a third transmission arrangement and since a bearing ring performs the function of a friction device for the load damper and the function of a friction device for the idle-speed damper, some components of the known torsional vibration dampers may be omitted, thereby simplifying the design and contributing to a saving in costs.

Since a delayed friction force with a delayed onset is provided for the idle-speed damper stage in addition to a continuously acting basic friction force, better tuning of the dynamic damping characteristics may be effected.

It should be pointed out that insofar as reference is made to the fact that the bearing arrangement, i.e. the bearing ring, is preloaded into bearing engagement with the hub element, this can mean direct contact between these two components but can also mean that the bearing ring is supported against the hub element via supporting components of whatever kind, which can then also form the mating bearing surface. The statement that the friction element, i.e. in the present case the bearing ring, may be displaced against one of the transmission arrangements, generating a frictional damping force, can mean that this element slides directly on a corresponding component of the associated transmission arrangement or is supported against this transmission arrangement via supporting components, which may be rigidly connected to this transmission arrangement. This means that, here too, there can be direct contact or support and frictional force generation can be provided via intermediate components.

Attention is once more drawn to the fact that, in the sense of the present invention, a "basic relative rotational position" is not necessarily the relative rotational position which is shown in FIG. 1 and in which the two damping arrangements 46, 62 are essentially relieved of load and the driver projections 108 are accommodated essentially centrally in the driver recesses 106. This is admittedly a basic relative rotational position, from which the delayed-action friction device will generate a frictional force after covering half the circumferential backlash between the driver projections 108 and the driver recesses 106. However, a delayed friction characteristic also occurs once the driver projections 108 have already begun to be taken along by the driver recesses 106, because the idle-speed damping device 62 has been subjected to load to a corresponding extent, even if a reversal of motion then occurs. In this case, the driver projections 108 will then pass through the full range of the circumferential backlash between them and the driver recesses 106 without the friction ring 110 being taken along first. Only when the driver recesses 106 have moved through this complete circumferential backlash will they again take the driver projections 108 along and a frictional force again be generated by the friction ring 110. This state can also occur when the introduction of appropriately severe torsional vibrations has led to the bridging of the idle-speed damper and ultimately to the main damper coming in to effect by virtue of the internal teeth 20 on the hub disk 18 striking against the external teeth 16 on the hub element 12 but, due to a reduction in the torque introduced, the springs of the main damper then having relaxed again and a reverse motion in the idle-speed damper range then occurring.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A torsional vibration damper, comprising:

a hub element;

a hub-disk arrangement arranged on said hub element and comprising a first transmission arrangement rotatable about an axis of rotation and a second transmission arrangement rotatable about said axis of rotation relative to said first transmission arrangement;

a first damping arrangement arranged between said first and the second transmission arrangements such that said second transmission arrangement is rotatable relative to said first transmission arrangement against an urgency of said first damping arrangement;

a third transmission arrangement connected to said hub element so that said third transmission arrangement is fixed with respect to rotation relative to said hub element, said third transmission arrangement being rotable about said axis of rotation relative to said hub-disk arrangements;

a second damping arrangement operatively arranged for interacting with said third transmission arrangement and one of said first and second transmission arrangements for allowing relative rotation between said third transmission arrangement and said one of said first and second transmission arrangements against an urgency of said second damping arrangement;

a first friction device arranged between said third transmission arrangement and at least one of said first and second transmission arrangements and comprising a first friction-device area, wherein said first friction device is operatively arranged such that the first friction device area generates no friction in a first angular range of relative rotation between the third transmission arrangement and said at least one of said first and second transmission arrangements and so that said first friction device area generates a frictional force when the first angular range of relative rotation is exceeded, said first angular range of relative rotation starting from a basic relative rotational position between said third transmission arrangement and at least one of said first and second transmission arrangements, wherein said first friction-device area comprises a friction-element arrangement operatively arranged so that said friction-element arrangement is preloaded against at least one of said third transmission arrangement and said at least one of said first and second transmission arrangements, said friction-element arrangement comprises at least one friction element operatively arranged for rubbing against said at least one of said third transmission arrangement and said at least one of said first and second transmission arrangements for generating the frictional force, said at least one friction element is operatively arranged for rubbing against said at least one of said first and second transmission arrangements and is connectable with said third transmission arrangement so that said at least one friction element is fixed with respect to rotation relative to said third transmission arrangement for generating said friction force, and said at least one friction element is freely rotatable relative to said third transmission element when said third transmission arrangement and said at least one of said first and second transmission arrangement are within the first angular range of relative rotation starting from the basic relative rotational position and said friction element is coupled to said third transmission arrangement for rotating with said third transmission arrangement when the angular range of relative rotation is exceeded.

2. The torsional vibration damper of claim 1, wherein said first friction-device area of said first friction device is effective only between said third transmission arrangement and said one of said first and second transmission arrangements that interacts with the second damper arrangement.

3. The torsional vibration damper of claim 1, wherein said first friction device further comprises a second friction-device area operatively arranged for generating a further frictional force essentially independently of a relative rotational position of said third transmission arrangement and said at least one transmission arrangement of said first and second transmission arrangements.

4. The torsional vibration damper of claim 2, wherein said one of said first and second transmission arrangements that interacts with said second damping arrangement comprises first and second disk areas arranged on opposing axial sides of said third transmission arrangement and wherein said first friction device is operatively arranged for rubbing against at least one of said first and second disk areas, for generating the frictional force.

5. The torsional vibration damper of claim 4, wherein said at least one of said first and second transmission arrangements is symmetrical in both axial directions relative to said third transmission arrangement.

6. The torsional vibration damper as claimed in claim 5, wherein said at least one of said first and second transmission arrangements comprises first and second disk parts respectively including said first and second disk areas, wherein said first and second disk parts are spaced apart axially in the area of said first and second disk areas and are connected to one another in an interconnected area arranged radially outside of said first and second disk areas.

7. The torsional vibration damper of claim 6, wherein said interconnected area of said first and second disk parts is designed to interact with said first damping arrangement.

8. A torsional vibration damper, comprising:
   a hub element;
   a hub-disk arrangement arranged on said hub element and comprising a first transmission arrangement rotatable about an axis of rotation and a second transmission arrangement rotatable about said axis of rotation relative to said first transmission arrangement;
   a first damping arrangement arranged between said first and the second transmission arrangements such that said second transmission arrangement is rotatable relative to said first transmission arrangement against an urgency of said first damping arrangement;
   a third transmission arrangement connected to said hub element so that said third transmission arrangement is fixed with respect to rotation relative to said hub element, said third transmission arrangement being rotable about said axis of rotation relative to said hub-disk arrangements;
   a second damping arrangement operatively arranged for interacting with said third transmission arrangement and one of said first and second transmission arrangements for allowing relative rotation between said third transmission arrangement and said one of said first and second transmission arrangements against an urgency of said second damping arrangement;
   a first friction device arranged between said third transmission arrangement and at least one of said first and second transmission arrangements and comprising a first friction-device area, wherein said first friction device is operatively arranged such that the first friction device area generates no friction in a first angular range of relative rotation between the third transmission arrangement and said at least one of said first and second transmission arrangements and so that said first friction device area generates a frictional force when the first angular range of relative rotation is exceeded, said first angular range of relative rotation starting from a basic relative rotational position between said third transmission arrangement and at least one of said first and second transmission arrangements; and
   a bearing arrangement, wherein said hub-disk arrangement is mounted on the hub element via said bearing arrangement, and a first preloading arrangement operatively arranged for preloading said bearing arrangement into bearing engagement on said hub element, said bearing arrangement comprising a bearing ring with a bearing surface having a shape comprising one of a conical and spherical shape, said hub element comprising a mating bearing having a shape complimentary to said bearing surface of said bearing ring, said bearing surface being preloaded into bearing engagement against said mating bearing surface of said hub element.

9. The torsional vibration damper of claim 8, wherein said bearing ring is fixed with respect to rotation relative to one of said first and second transmission arrangements.

10. The torsional vibration damper of claim 9, wherein said bearing ring comprises at least one coupling portion via which said bearing ring is coupled to said one of said first transmission arrangement and said second transmission arrangement.

11. A torsional vibration damper, comprising:
    a hub element;
    a hub-disk arrangement arranged on said hub element and comprising a first transmission arrangement rotatable about an axis of rotation and a second transmission arrangement rotatable about said axis of rotation relative to said first transmission arrangement;
    a first damping arrangement arranged between said first and the second transmission arrangements such that said second transmission arrangement is rotatable relative to said first transmission arrangement against an urgency of said first damping arrangement;
    a third transmission arrangement connected to said hub element so that said third transmission arrangement is fixed with respect to rotation relative to said hub element, said third transmission arrangement being rotable about said axis of rotation relative to said hub-disk arrangements;
    a second damping arrangement operatively arranged for interacting with said third transmission arrangement and one of said first and second transmission arrangements for allowing relative rotation between said third transmission arrangement and said one of said first and second transmission arrangements against an urgency of said second damping arrangement;
    a first friction device arranged between said third transmission arrangement and at least one of said first and second transmission arrangements and comprising a first friction-device area, wherein said first friction device is operatively arranged such that the first friction device area generates no friction in a first angular range of relative rotation between the third transmission arrangement and said at least one of said first and second transmission arrangements and so that said first friction device area generates a frictional force when the first angular range of relative rotation is exceeded, said first angular range of relative rotation starting from a basic relative rotational position between said third transmission arrangement and at least one of said first and second transmission arrangements; and
    a second friction device operatively arranged for generating a frictional damping force during relative rotation between said first and second transmission arrangements, said second friction device comprising at least one friction element and a preloading arrangement, wherein said preloading arrangement is operatively arranged for acting on said at least one friction element so that said at least one friction element is displaced on one of said first and second transmission arrangements during relative rotation therebetween for generating a frictional damping force.

12. The torsional vibration damper of claim 11, further comprising a bearing arrangement, wherein said hub-disk arrangement is mounted on the hub element via said bearing arrangement, and a first preloading arrangement operatively arranged for preloading said bearing arrangement into bearing engagement on said hub element, said bearing arrangement comprising a bearing ring with a bearing surface having a shape comprising one of a conical and spherical shape, said hub element comprising a mating bearing having a shape complimentary to said bearing surface of said bearing ring, said bearing surface being preloaded into bearing engagement against said mating bearing surface of said hub element, wherein said bearing arrangement comprises at least a portion of said at least one friction element of said second friction device.

13. The torsional vibration damper of claim 12, wherein one of said first and second transmission arrangements comprises a disk transmission element and the other of said first and second transmission arrangements comprises first and second cover-disk elements arranged on opposing axial sides of said disk transmission arrangement, said first and second cover-disk elements being fixed with respect to rotation, and wherein said bearing arrangement comprises a friction area arranged between said disk transmission arrangement and one of said first and second cover-disk elements.

14. The torsional vibration damper of claim 13, wherein said preloading arrangement is operatively arranged between said disk transmission arrangement and the other one of said first and second cover-disk elements for urging said disk transmission arrangement towards said one of said first and second cover-disk elements such that said friction area of said bearing arrangement is clamped between said disk transmission arrangement and said one of said first and second cover-disk elements to generate the frictional damping force.

15. The torsional vibration damper of claim 12, further comprising a second preloading arrangement operatively arranged for urging said bearing ring into bearing engagement against said hub element and against that transmission arrangement of said first and second transmission arrangements on which said bearing arrangement is displaceable for, generating the frictional damping force.

16. The torsional vibration damper of claim 15, wherein one of said first and second transmission arrangements comprises a disk transmission element and the other of said first and second transmission arrangements comprises first and second cover-disk elements arranged on opposing axial sides of said disk transmission arrangement, said first and second cover-disk elements being fixed with respect to rotation, and wherein said bearing arrangement comprises a friction area arranged between said disk transmission arrangement and one of said first and second cover-disk elements, and wherein said preloading arrangement is supported against the other one of said first and second cover-disk elements.

* * * * *